US011969760B1

United States Patent
De La Rosa et al.

(10) Patent No.: US 11,969,760 B1
(45) Date of Patent: Apr. 30, 2024

(54) SINGULATION AND SORTATION DEFECT DETECTION

(71) Applicant: Amazon Technologies, Inc., Seattle, WA (US)

(72) Inventors: Jose Luis De La Rosa, Seattle, WA (US); Ting Xu, Kirkland, WA (US); Duncan Pratt, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/545,945

(22) Filed: Dec. 8, 2021

(51) Int. Cl.
*B07C 5/34* (2006.01)
*B07C 5/16* (2006.01)
*G06N 20/00* (2019.01)
*G06T 7/00* (2017.01)
*G06V 20/64* (2022.01)
*G07C 3/14* (2006.01)

(52) U.S. Cl.
CPC .............. *B07C 5/34* (2013.01); *B07C 5/16* (2013.01); *G06N 20/00* (2019.01); *G06T 7/0004* (2013.01); *G06V 20/64* (2022.01); *G07C 3/14* (2013.01); *G06T 2207/20081* (2013.01); *G06T 2207/30108* (2013.01)

(58) Field of Classification Search
CPC .......... G07C 3/14; G07C 3/143; G07C 3/146; B07C 5/34; B07C 5/342; B07C 5/16
See application file for complete search history.

(56) References Cited

U.S. PATENT DOCUMENTS

| 4,387,064 | A | * | 6/1983 | Werderitch | G07C 3/14 425/149 |
| 8,244,025 | B2 | * | 8/2012 | Davis | G06K 9/00 700/98 |
| 2020/0124484 | A1 | * | 4/2020 | Fuller | G04F 1/00 |
| 2020/0338598 | A1 | * | 10/2020 | Jang | B07C 5/28 |
| 2020/0363342 | A1 | * | 11/2020 | Nygaard | B07C 5/3422 |
| 2022/0105544 | A1 | * | 4/2022 | Zhao | G06T 7/90 |
| 2022/0105545 | A1 | * | 4/2022 | Douglas | B07C 5/342 |
| 2022/0127083 | A1 | * | 4/2022 | Elmardini | B65G 43/10 |
| 2022/0162012 | A1 | * | 5/2022 | Nokelby | G06T 7/0002 |
| 2023/0053393 | A1 | * | 2/2023 | Peeters | G06T 7/0004 |

* cited by examiner

*Primary Examiner* — Patrick H Mackey
*Assistant Examiner* — Jessica L Burkman
(74) *Attorney, Agent, or Firm* — Athorus, PLLC

(57) ABSTRACT

Disclosed are systems and methods for detecting defects during the handling and processing of items at a material handling facility. Embodiments of the present disclosure can be implemented at material handling to detect quality defects during processing of items in connection with fulfillment operations that may be designed to receive, store, sort, pick, pack, and ship items. Embodiments of the present disclosure provides a plurality of sensors and a trained machine learning model configured to provide real-time acquisition and analysis of item information to facilitate detection and mitigation of processing quality defects.

20 Claims, 12 Drawing Sheets

SINGULATION AND SORTATION DEFECT DETECTION

BACKGROUND

Many companies may receive, store, sort, pick, pack, and ship items to and from material handling facilities. For example, many companies may store, pick, singulate, and/or sort items in a material handling facility. These processes may be performed to facilitate storage, shipment, etc. of the items to various destinations (e.g., customers, stores, storage areas/facilitates, other material handling facilities, and the like). The various processes employed in the singulation and sortation of items, which may employ both automated and manual processes, may result in quality defects, such as improperly processing multiple items, processing damaged items, processing incorrect items, and the like. These quality defects in the processing of items typically results in delays and increased costs.

DETAILED DESCRIPTION

Figure 1A:
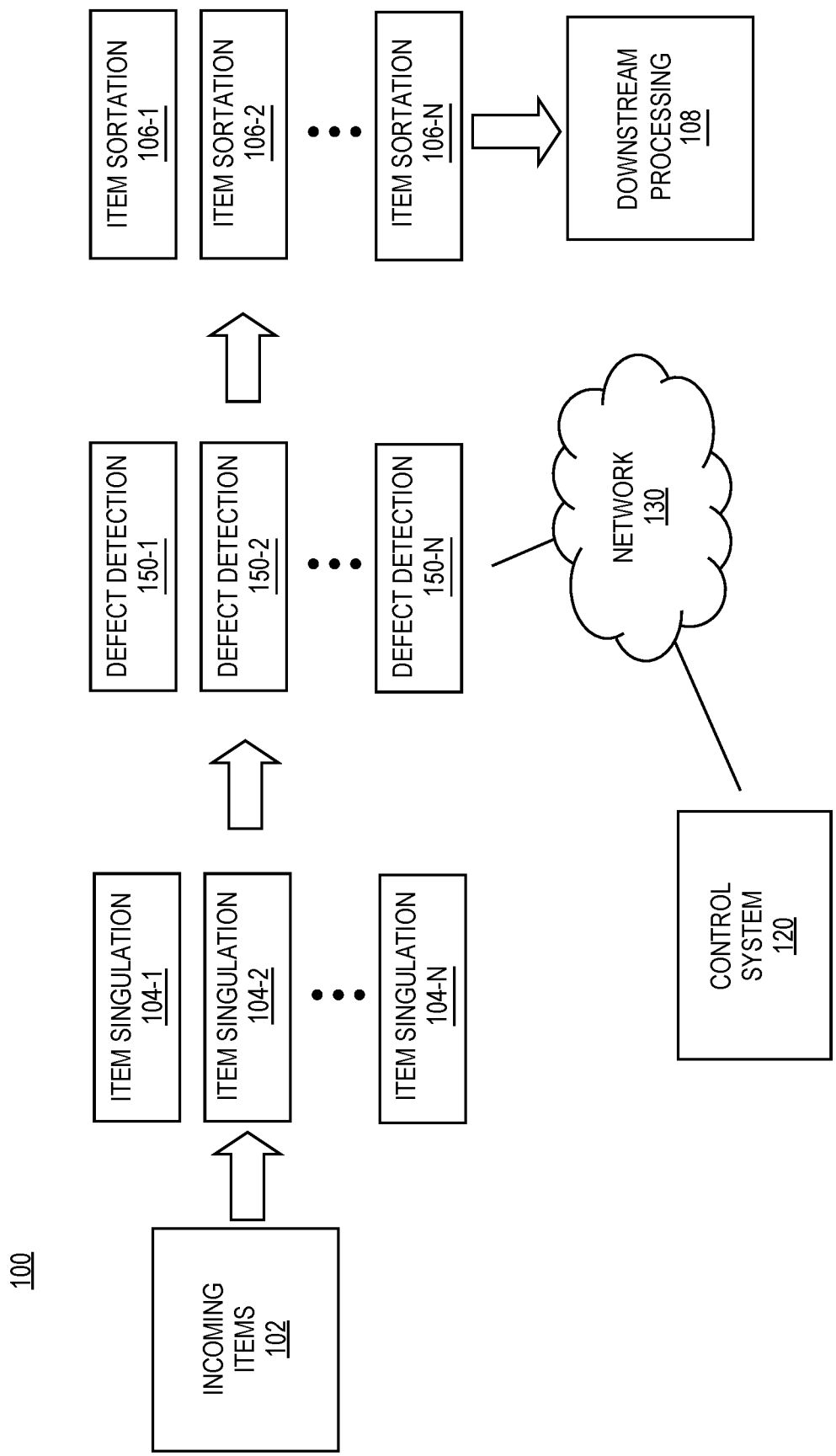
FIG. 1A is a block diagram of an exemplary automated item handling system, according to exemplary embodiments of the present disclosure.

As is set forth in greater detail below, embodiments of the present disclosure are generally directed to systems and methods for detecting defects during the handling and processing of items at a material handling facility. Embodiments of the present disclosure can be implemented at material handling facilities (e.g., a cross dock center, a fulfillment center, a warehouse, etc.) to detect quality defects during processing of items in connection with fulfillment operations that may be designed to receive, store, sort, pick, pack, and ship items. Often, fulfillment operations typically process a wide variety of items, at a high rate of speed, and the items being processed may be received, stored, and/or processed in various types of packages/packaging, such as boxes, cases, totes, pallets, paper packaging, plastic packaging, corrugated packaging, single item packages, multiple item packages, and the like. Accordingly, quality defects, such as the processing of incorrect items, the processing of the wrong quantity of items, the processing of damaged items, and the like, may not be uncommon. Embodiments of the present disclosure can provide a plurality of sensors and a trained machine learning model configured to provide real-time acquisition and analysis of item information to facilitate detection and mitigation of processing quality defects.

According to an exemplary embodiment of the present disclosure, an item information acquisition system and a trained machine learning model can be provided. The item information acquisition system may employ one or more sensors, such as high-resolution imaging devices, cameras, infrared sensors, depth sensors, ranging or time of flight sensors (e.g., laser, LIDAR, infrared, etc.), scales, scanners (e.g., barcode, QR, etc.), and the like, to obtain item information, such as dimensions, weight, volume, etc. The acquired item information may be provided to the trained machine learning model, which may be configured to process the item information to facilitate item identification, item verification, item analysis, and the like, which may facilitate real-time detection and mitigation of quality defects encountered during the processing of the items.

According to an embodiment of the present disclosure, the item information acquired by the one or more sensors may be provided to one or more datastores configured to store and maintain item information to improve data quality associated with the items. For example, the acquired item information may be provided to update item catalog information associated with the items that are processed according to embodiments of the present disclosure. Alternatively and/or in addition, the acquired information may be used to generate and/or augment models associated with the items.

Embodiments of the present disclosure may be deployed in connection with automated singulation and/or sortation systems in material handling facilities for fulfillment operations. Accordingly, embodiments of the present disclosure may utilize and/or supplement various automated machinery or equipment, conveyance systems, sensors, measurement devices, robotic arms, automated storage and retrieval systems, automated packing systems or machines, autonomous mobile robots, robotic drive units, material handling equipment, or other substantially automated devices, machines, or processes to provide safe, reliable, efficient, and automated material handling processes that may also reduce the time and cost associated with such processes.

FIG. 1A is a block diagram of an exemplary automated item handling system 100, according to exemplary embodiments of the present disclosure. As shown in FIG. 1A, exemplary automated item handling system 100 can facilitate automated handling and processing of incoming items 102.

According to exemplary embodiments of the present disclosure, automated item handling system 100 can include one or more item singulation stations 104-1, 104-2, through 104-N, one or more universal item sorters 106-1, 106-2, through 106-N, and defect detection systems 150-1, 150-2, through 150-N. The various systems of automated item handling system 100 can be implemented at material handling facilities to process incoming items. For example, automated item handling system 100 may receive incoming items 102 from upstream facilities or processes (e.g., an item supplier, from inventory, from a warehouse, decanting processing, etc.) to process the items for further downstream processing 108 (e.g., sorting for storage, packing, palletizing, shipping, etc.). For example, item singulation stations 104-1, 104-2, through 104-N may employ various slides, chutes, ramps, conveyors, belts, or other components that may move and singulate the decanted items using a series of, and/or multiple types of, motions, turns, vibrations, or other movements or actuations.

After the items have been separated and singulated and prior to providing the item to universal item sorters 106-1, 106-2, through 106-N, defect detection system 150 may analyze the singulated items to detect quality defects, identify the items, and the like. According to exemplary embodiments of the present disclosure, defect detection systems 150-1, 150-2, through 150-N may include one or more sensors to acquire certain item information associated with each singulated item. The item information may be processed by a trained machine learning model to identify quality defects (e.g., singulation errors, damaged items, etc.), identify the items ingested by item singulation stations 104-1, 104-2, through 104-N, and the like.

The separated and singulated items may then be provided to universal item sorters 106-1, 106-2, through 106-N. Universal item sorters 106-1, 106-2, through 106-N may sort the singulated items into containers (e.g., totes, bins, etc.). The items may be sorted such that items of the same type are sorted into a container. Alternatively and/or in addition, items having the same destination (e.g., storage, another facility, etc.) may be sorted into a container, and the like. Example universal item sortation machines may include various commercial machinery, such as OPEX universal item sortation machines or other similar systems, machines, or equipment.

Automated item handling system 100 can also include control system 120, which can communicate with item singulation stations 104, universal item sorters 106, and defect detection systems 150 via network 130. For example, network 130 can include any wired or wireless network (e.g., cellular, satellite, Bluetooth, Wi-Fi, etc.) such as a local area network, wide area network, etc. that can facilitate communications between item singulation stations 104, universal item sorters 106, defect detection systems 150, and control system 120. Item singulation stations 104, universal item sorters 106, defect detection system 150, and control system 120 can transmit data and other information, including one or more instructions, data, sensor information, commands, etc., via network 130. Control system 120 is discussed in further detail below with respect to FIG. 9, which can control the operation, automation, communication, etc. of automated item handling system 100.

In operation, incoming items 102 can be received by automated item handling system 100 from any upstream process or facility. For example, incoming items 102 may be received from a supplier, a manufacturer, another material handling facility, and the like, via an inbound vehicle (e.g., truck). Accordingly, the items may have been offloaded from the vehicle in pallets and depalletized prior to induction into automated item handling system 100. Accordingly, incoming items 102 may arrive as freight, packaged in boxes, packaged in pallets, contained in containers (e.g., totes, trays, bin, etc.), and the like. The offloading and depalletizing of incoming items 102 may be automated (e.g., performed by automated ground vehicles) or may be performed manually. Incoming items 102 can be received by automated item handling system 100 from any other type of upstream process as well.

After offloading and depalletizing, incoming items 102 may be received by automated item handling system 100. For example, incoming items may be inducted into item singulation stations 104-1, 104-2, through 104-N to separate and singulate items in preparation for sortation (e.g., by universal item sorter 106-1 through 106-N). For example, item singulation stations 104-1, 104-2, through 104-N can separate each of the incoming items 102 to have a certain gap distance between each item and arrange each of the incoming items 102 in a straight line. According to certain exemplary embodiments, item singulation stations 104-1, 104-2, through 104-N can include an arrangement of cascading conveying elements.

After the items have been singulated by item singulation stations 104-1, 104-2, and/or 104-N, the items may be processed by defect detection systems 150-1, 150-2, through 150-N. According to exemplary embodiments of the present disclosure, defect detection systems 150-1, 150-2, through 150-N may each employ one or more sensors to acquire certain item information associated with each singulated item received from item singulation stations 104-1, 104-2, through 104-N. The item information may be processed by a trained machine learning model to identify quality defects (e.g., singulation errors, damaged items, etc.), identify the items ingested by item singulation stations 104-1, 104-2, through 104-N, and the like. The acquired item information may also be provided to various datastores to generate and/or catalog information associated with each item.

For any items that defect detection systems 150-1, 150-2, through 150-N may have detected a quality defect (e.g., singulation errors, damaged items, incorrect item, etc.), defect detection systems 150-1, 150-2, through 150-N may cause any such items to be removed for reprocessing. For example, in exemplary implementations where defect detection systems 150-1, 150-2, through 150-N may have detected a multiple (e.g., a singulation error such that more than one item was improperly ingested into the system when only one item was expected), the multiple may be removed for reprocessing so that it may be properly singulated. Similarly, in other example implementations where defect detection systems 150-1, 150-2, through 150-N may have detected a damaged item, or an unexpected item (e.g., a detected and identified item does not match expected items), such item may also be removed for inspection, reprocessing, and the like. Removal for reprocessing may be performed by defect detection system 150. Alternatively and/or in addition, defect detection systems 150-1, 150-2, through 150-N may send an instruction to universal item sorter 106-1, 106-2, through 106-N to sort any such item into a container specifically designated for inspection, reprocessing, etc. of items for which a quality defect has been identified. Optionally, the items for which a quality defect has been identified may be sorted based on the type of quality defect identified. Specifically, each type of quality defect may be sorted into a container specifically designated for the corresponding quality defect. Accordingly, damaged items may be sorted into a common container, multiples may be sorted into another container, unexpected items may be sorted into another container, and the like.

After incoming items 102 have been separated and arranged by item singulation stations 104-1, 104-2, through 104-N and processed by defect detection systems 150-1, 150-2, through 150-N, the items can be provided to universal item sorters 106-1, 106-2, through 106-N. According to aspects of the present disclosure, item singulation stations 104-1, 104-2, through 104-N, defect detection systems 150-1, 150-2, through 150-N, and universal item sorters 106-1, 106-2, through 106-N may be configured and oriented such that the singulated items can be processed and pass directly to universal item sorters 106-1, 106-2, through 106-N without any manual handling of the singulated and processed items. For example, defect detection systems 150-1, 150-2, through 150-N may be a stand-alone modular component and/or deployed along any of the various conveyances employed by item singulation stations 104-1, 104-2, through 104-N and/or universal item sorters 106-1, 106-2, through 106-N (e.g., in a scan tunnel associated with universal item sorters 106-1, 106-2, through 106-N, at the interface between item singulation stations 104-1, 104-2, through 104-N and/or universal item sorters 106-1, 106-2, through 106-N, and the like). Further, automated item handling system 100 can be implemented in a modular fashion such that it may include any number of item singulation stations 104, defect detection systems 150, and universal item sorters 106.

Figure 1B:
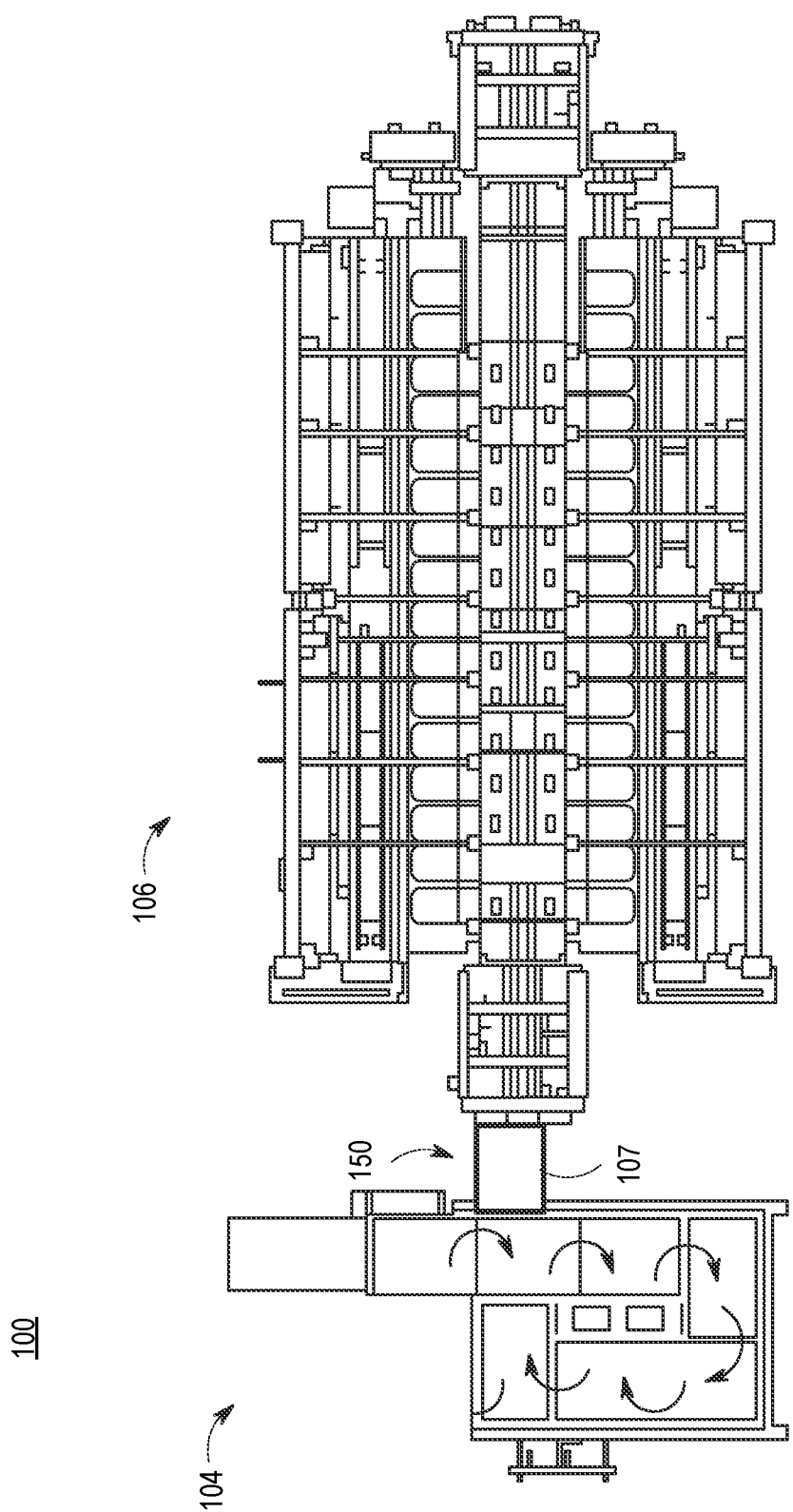
FIG. 1B is an overhead schematic illustration of an exemplary automated item handling system and an exemplary automated item sortation system, according to exemplary embodiments of the present disclosure.

FIG. 1B is an overhead schematic illustration of an exemplary automated item handling system 100, according to exemplary embodiments of the present disclosure. Exemplary automated item handling system 100 can facilitate automated handling and processing of incoming items 102.

Exemplary automated item handling system 100 shown in FIG. 1B can represent one exemplary implementation of item singulation stations 104, defect detection systems 150, and universal item sorters 106. As shown in FIG. 1B, defect detection system 150 may be implemented in scan tunnel 107 of universal item sorter 106.

As shown in FIG. 1B, item singulation station 104 may decant, dump, empty, or otherwise place the incoming items onto one or more slides, chutes, conveyors, or other material handling equipment. For example, the automated item singulation station 104 may comprise a series of or multiple slides, chutes, ramps, conveyors, belts, or other components that may move and singulate the decanted items using a series of, and/or multiple types of, motions, turns, vibrations, or other movements or actuations to arrange the items in a spaced, substantially parallel orientation.

As the singulated items pass from item singulation station 104 to universal item sorter 106, the items may be processed by defect detection systems 150. For example, the one or more sensors employed by defect detection systems 150 may be disposed along the conveyances configured to move and transport the items through item singulation station 104 and to universal item sorters 106. In one exemplary implementation and as shown in FIG. 1B, defect detection systems 150 may be deployed in scan tunnel 107 of universal item sorter 106. Accordingly, the one or more sensors of defect detection system 150 may acquire item information associated with the item as the item is transported via the various conveyances. The acquired item may be processed by one or more trained machine learning models to detect quality defects, such as a multiple, a damaged item, and the like, and/or identify the items ingested by item singulation station 104 and being provided to universal item sorters 106. The acquired item information may also be provided to various datastores to generate and/or catalog information associated with each item.

Then, the singulated and processed items may be transferred by conveyances to one or more universal item sorters 106. Automated universal item sorters 106 may receive the singulated and processed items and sort them to one or more containers. In some example embodiments, items of a single type may be sorted to one or more containers. In other example embodiments, items of multiple types may be sorted to one or more containers. According to exemplary embodiments, the items may be sorted into an array of containers based on downstream processes or requirements (e.g., common destinations, item type, item size, etc.). Additionally, the containers may be filled with items in order to be substantially full or to reach a desired weight, thereby increasing or maximizing storage density of items within the containers. Example universal item sortation machines may include various commercial machinery, such as OPEX universal item sortation machines or other similar systems, machines, or equipment. Further, the containers may be transferred to be processed by downstream processes (e.g., storage, retrieval, packing for shipment, AMRs, robots, or other material handling equipment).

In addition, universal item sorters 106 may be configured to receive instructions from defect detection systems 150 to separate/remove items associated with identified quality defects (e.g., detection of a multiple, a damaged item, an unexpected item, and the like) for inspection and/or reprocessing. For example, any such items may be sorted by universal item sorters 106 to one or more containers specifically designated for items associated with detected quality defects. According to certain aspects of the present disclosure, each container may be specifically designated for a type of detected quality defect.

Further, although item singulation station 104 and universal item sorter 106 are shown arranged in a substantially linear orientation relative to each other, item singulation station 104 and universal item sorter 106 can be arranged in any relative orientation based on the needs, desires, and/or design of the facility in which they may be implemented. For example, item singulation station 104 and universal item sorter 106 can be arranged at any angle (e.g., 15°, 30°, 45°, 60°, 90°, or any other angle) relative to each other.

Figure 2:
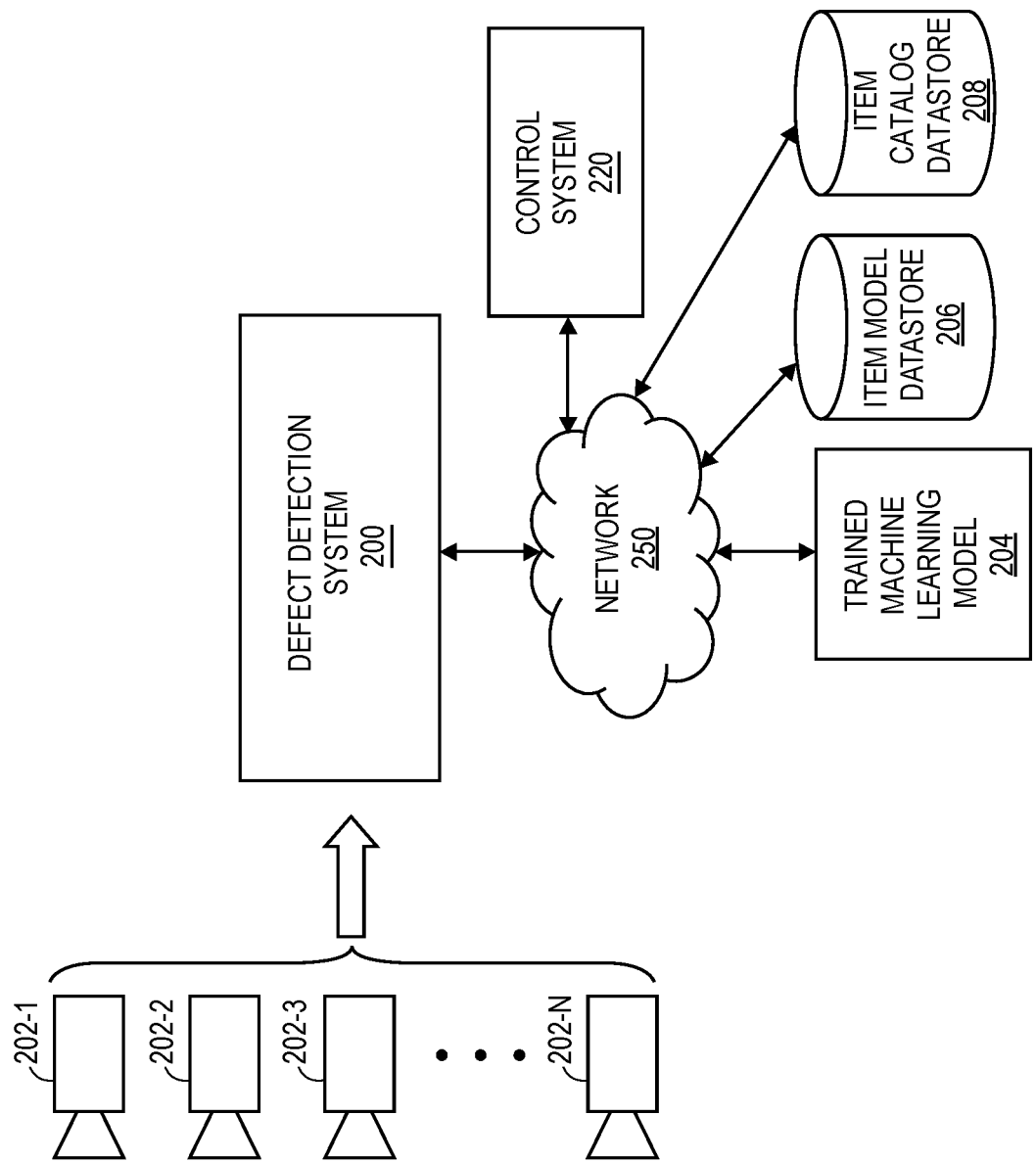
FIG. 2 is a block diagram of an exemplary defect detection system, according to exemplary embodiments of the present disclosure.

FIG. 2 is a block diagram of an exemplary defect detection system 200, according to exemplary embodiments of the present disclosure. Exemplary defect detection system 200 shown in FIG. 2 can represent one exemplary implementation of defect detection system 150.

As shown in FIG. 2, defect detection system 200 may include one or more sensors 202-1, 202-2, 202-3, through 202-N and trained machine learning model 204. Trained machine learning model 204 may execute on one or more remote computing resources, which may include, for example, "on-demand computing," "software as a service (SaaS)," "platform computing," "network-accessible platform," "cloud services," "data centers," and so forth. Example components of a server that may be included in exemplary computing resources are discussed below with respect to FIG. 8.

Sensors 202-1, 202-2, 202-3, through 202-N may be implemented as a computer vision system, and may include imaging sensors, cameras, infrared sensors, depth sensors, ranging or time of flight sensors, scales, scanners, or other types of sensors. Accordingly, sensors 202-1, 202-2, 202-3, through 202-N may capture certain data and item information (e.g., imaging data, depth information, weight, dimensions, volume information, three-dimensional point clouds, etc.) associated with items as they are transported and processed by material handling equipment (e.g., automated item handling system 100) in a material handling facility. In exemplary implementations, sensors 202-1, 202-2, 202-3, through 202-N may capture the item information as the items are transported from an item singulation system (e.g., item singulation station 104) to a sorting system (e.g., universal item sorter 106) via a conveyance, such as a conveyor belt.

The captured item information may be provided to trained machine learning model 204 (e.g., a neural network, a deep learning model, and the like), which may process the item information (e.g., using algorithms to perform edge detection, feature detection, object detection, or other types of image processing algorithms) to detect quality defects in the items in real-time. Trained machine learning model 204 may employ any type of machine learning model (and may have been trained to detect and identify quality defects (e.g., multiples, damaged items, and the like) associated with the items. Additionally, the item information may be used to identify the items themselves. For example, the item information (e.g., imaging data, dimensions, detected features, detected objects, etc.) may be processed to determine an item identifier associated with the item. Based on the determinations made by trained machine learning model 204, defect detection system 200 may include control system 220 to remove the item in question for inspection and/or reprocessing. For example, defect detection system 200 may send a command or instruction to control system 220, instructing the sortation system to sort the item in question into one or more containers designated for items for which a quality defect has been detected.

In exemplary implementations where the trained machine learning model obtains item information acquired from multiple different types of sensors, such as sensors 202-1, 202-2, 202-3, through 202-N (e.g., imaging sensors, cameras, infrared sensors, depth sensors, ranging or time of flight sensors, scales, scanners, or other types of sensors), exemplary embodiments of the present disclosure may aggregate and/or merge the different sources of item information to generate a predication in connection with detection of a quality defect and/or an identification of the item. For example, trained machine learning model 204 may generate a prediction in connection with the item information provided by each of the various types of sensors, along with a confidence score associated with each prediction. The predictions associated with each data sensor may be aggregated (e.g., a weighted sum, etc.) to generate an overall prediction of whether a quality defect is detected and/or an identification of the item.

Additionally, the captured item information may be used to generate and/or augment item information that may be stored in one or more datastores, such as item model datastore 206 and/or item catalog datastore 208. For example, item model datastore 206 may be configured to store and maintain virtual models for items that may be processed by automated item handling system 100. Accordingly, after the item has been identified, the virtual models stored in item model datastore 206 may be searched for the item identified by defect detection system 200. If an entry for the identified item exists in the virtual models stored in item model datastore 206, the item information may be provided to item model datastore 206 to update any virtual models associated with the items processed and identified by defect detection system 200. In the event that a virtual model for the identified item does not exist in item model datastore 206, a virtual model may be created for the identified item. Accordingly, tor each item processed by defect detection system 200 (whether or not a quality defect had been detected), the item information acquired by sensors 202-1, 202-2, 202-3, through 202-N may be provided to item model datastore 206 to generate and/or update any virtual models associated with each item. This can improve the accuracy of the virtual models stored and maintained in item model datastore 206.

Similarly, item catalog datastore 208 may be configured to store and maintain a virtual catalog of the items that may be processed by material handling equipment (e.g., automated item handling system 100). The items may be stored in an item catalog according to an item number or identifier (e.g., a Universal Product Code, or "UPC," an Electronic Product Code, or "EPC," a Stock Keeping Unit number, or "SKU," or a standard identification number, such as an "ASIN") or another identifier associated with the item. Accordingly, after the item has been identified, the item catalog stored in item catalog datastore 208 may be searched for the item identified by defect detection system 200. If an entry for the identified item exists in the virtual models stored in item model datastore 206, the item information may be provided to item catalog datastore 208 to update the corresponding entry in the item catalog stored in item catalog datastore 208 associated with the item processed and identified by defect detection system 200. In the event that an item catalog entry does not exist in item catalog stored in item catalog datastore 208, an item catalog entry may be created for the identified item. Accordingly, item information may be provided to item catalog datastore 208 to generate and/or update catalog entries associated with items processed by defect detection system 200. For each item processed by defect detection system 200 (whether or not a quality defect had been detected), the item information acquired by sensors 202-1, 202-2, 202-3, through 202-N may be provided to item catalog datastore 208 to generate and/or update any catalog information associated with each item to improve the accuracy of the catalog information stored and maintained in item catalog datastore 208.

Figure 3A:
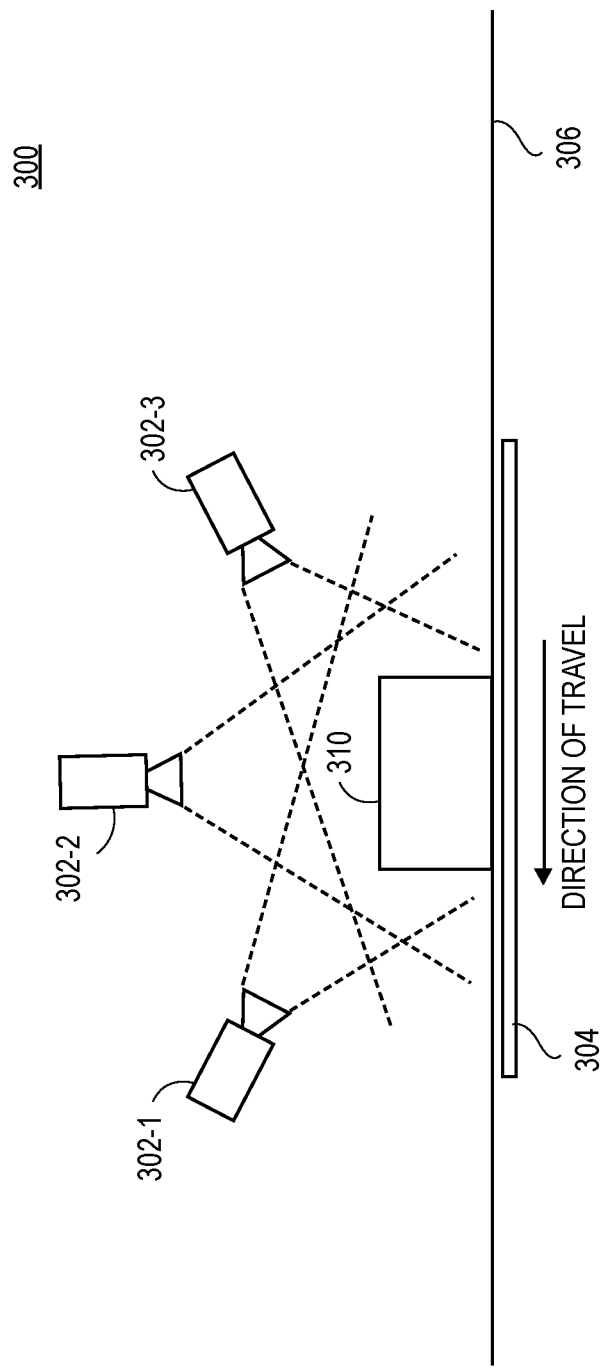
FIGS. 3A and 3B are illustrations of an exemplary defect detection system, according to exemplary embodiments of the present disclosure.
Figure 3B:
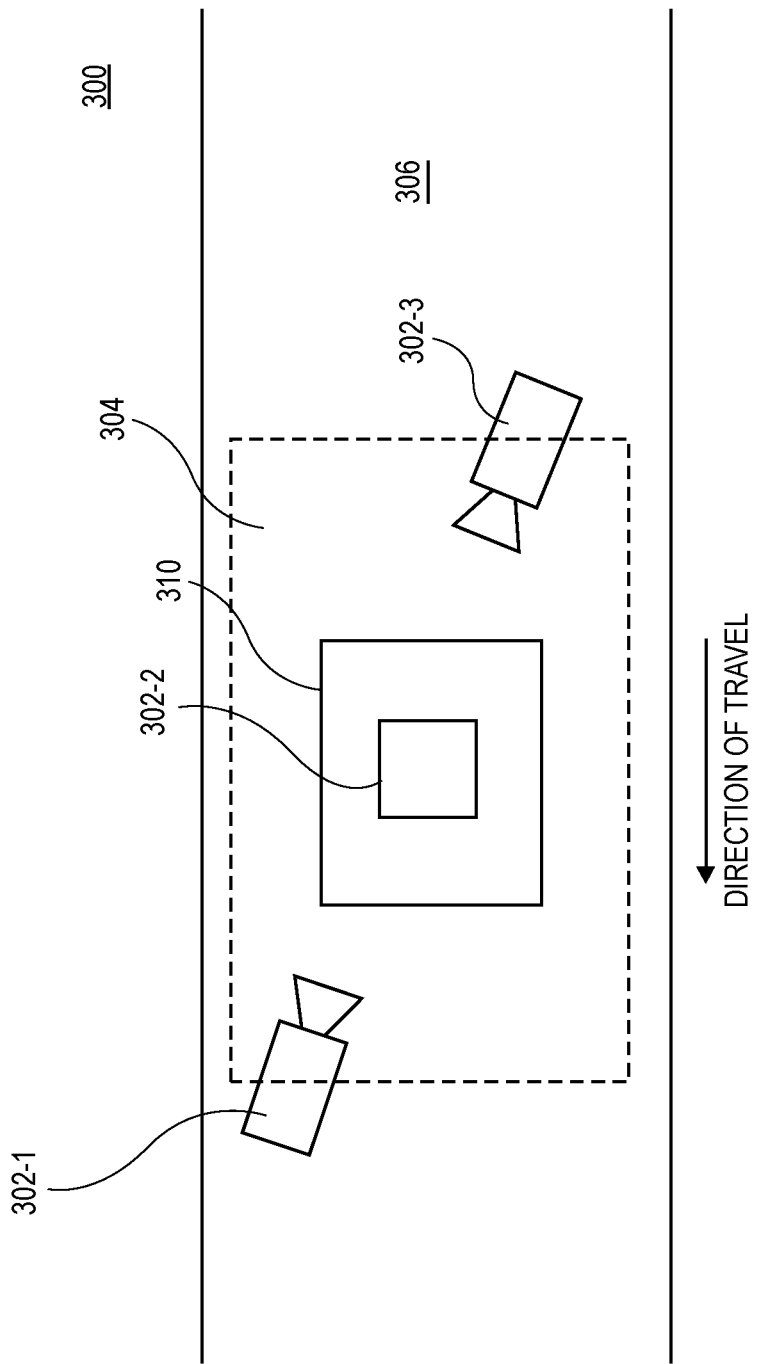

FIGS. 3A and 3B are illustrations of an exemplary defect detection system 300, according to exemplary embodiments of the present disclosure. Exemplary defect detection system 300 shown in FIGS. 3A and 3B can represent one exemplary implementation of defect detection system 150. FIG. 3A illustrates a side view of defect detection system 300 relative to item 310 being transported via a conveyance, and FIG. 3B illustrates an overhead view of defect detection system 300.

FIGS. 3A and 3B illustrate an exemplary implementation where defect detection system 300 may be processing an item that is being processed and handled by material handling equipment (e.g., automated item handling system 100) in a material handling facility. As shown in FIGS. 3A and 3B, item 310 may have been singulated (e.g., by item singulation station 104) and is being transported via conveyance 306 to be sorted (e.g., by universal item sorter 106). Accordingly, as item 310 travels via conveyance 306, sensors 302-1, 302-2, 302-3, and 304 may capture item information associated with item 310, which may be processed to identify item 310 and/or detect quality defects associated with item 310.

According to exemplary embodiments of the present disclosure, sensors 302-1, 302-2, and 302-3 may include imaging sensors, cameras, infrared sensors, depth sensors, ranging or time of flight sensors, scanners, or other types of sensors configured to capture image information, pixel information, depth information, and/or volume information associated with item 310. Sensors 302-1, 302-2, and 302-3 may be positioned and oriented in a configuration to facilitate capturing item information from different angles and perspectives. As shown in FIGS. 3A and 3B, sensor 302-1 may be positioned and configured to capture item information from an angle above item 310 from the front, whereas sensor 302-3 may be positioned and configured to capture item information from an angle above item 310 from the rear, and sensor 302-2 may be positioned as an overhead sensor. Further, as shown in FIG. 3B, sensors 302-1 and 302-3 may be positioned oblique relative to each other to facilitate capturing of item information from different angles. Accordingly, the positioning and orientation of sensors 302-1, 302-2, and 302-3 may facilitate capturing item information regarding how item 310 is positioned on conveyance 306, the appearance/shape/etc. of item 310, and the like. Further, although FIGS. 3A and 3B show defect detection system 300 having three sensors 302-1, 302-2, and 302-3, defect detection system 300 may employ any number of sensors positioned and oriented in any configuration (e.g., sensors positioned at the sides of item 310, sensors positioned beneath item 310, additional sensors above, to the front, and to the rear of item 310, etc.).

Additionally, defect detection system 300 may also include sensor 304. Sensor 304 may include a scale, a balance, or any other sensor that may facilitate measuring the weight and/or mass of item 310. The information captured by one or more of sensors 302-1, 302-2, 302-3, and 304 may be merged, aggregated, and/or processed to facilitate various downstream processes.

In one exemplary implementation, the captured item information may be provided as an input to a trained machine learning model to identify item 310 and detect quality defects, such as multiples, associated with item 310 in real-time. For example, if multiple items are inducted together and not properly singulated (e.g., the items are side-by-side, overlapped, on top of each other, etc.), the trained machine learning model may determine that the item being processed is a multiple and indicate to a downstream sortation system that the items should be sorted for inspection and/or reprocessing. Additionally, the captured item information may be processed to identify item 310 in real-time. The identification of item 310 can facilitate determinations of whether the correct items are being processed, as well as providing the item information to datastores of item information (e.g., item model datastore 206 and/or item catalog datastore 208) to generate and/or update the item information stored therein. Alternatively and/or in addition, sensors 302-1, 302-2, 302-3, and 304 may be used to detect the presence of an item (e.g., item 310) and may facilitate triggering of other downstream processes (e.g., activation of universal sorter 106, activation of a barcode scanner, and the like).

In yet another exemplary implementation, the captured item information and/or item attributes may be processed to determine in real-time whether item 310 is damaged, incomplete/missing components, and the like. For example, the item information can be analyzed and compared against expected values to detect whether the packaging appears to be damaged, the weight or mass is less than an expected value, and the like. In such a scenario, an indication may also be generated in connection with any damaged items and/or incomplete items/items missing components so that they may also be sorted for inspection and/or reprocessing.

FIGS. 4A-4D are illustrations of exemplary images 400, 410, 420, and 430 that may have been captured by an exemplary defect detection system, according to exemplary embodiments of the present disclosure. In exemplary embodiments, FIGS. 4A-4D may represent images captured by sensors 302-1, 302-2, 302-3.

Figure 4A:
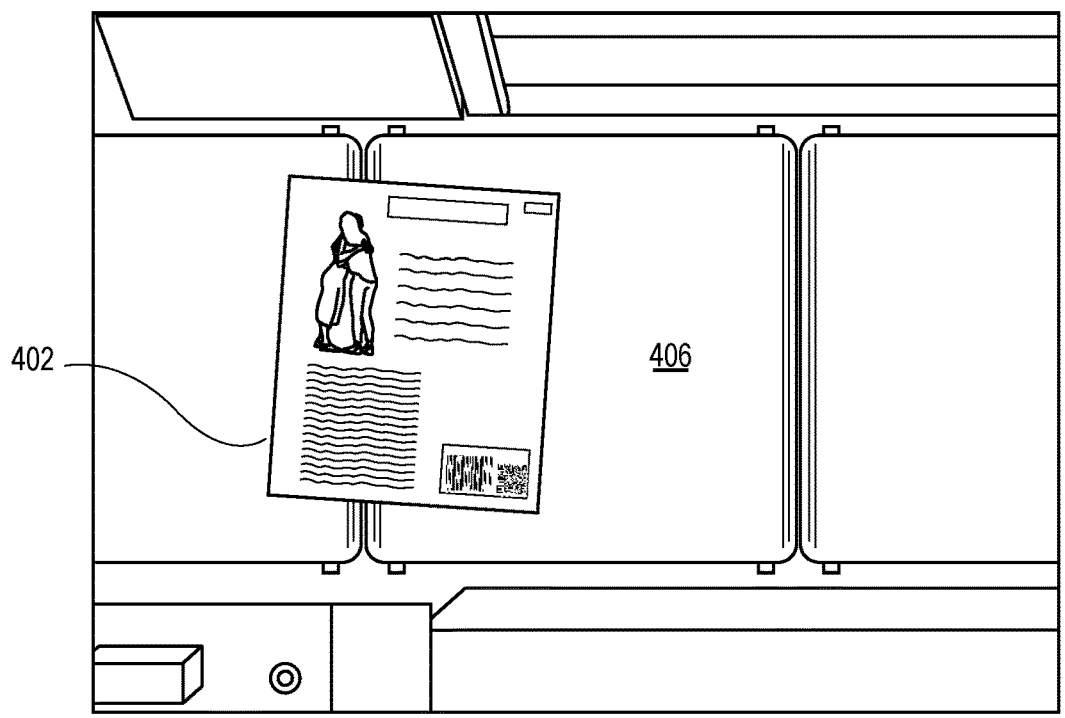
FIGS. 4A-4D are illustrations of exemplary images captured by an exemplary defect detection system, according to exemplary embodiments of the present disclosure.

FIG. 4A shows an exemplary illustration of image 400 of an item in connection with processing by a defect detection system, according to exemplary embodiments of the present disclosure. As shown in FIG. 4A, image 400 may include a visual representation of item 402 as it is being transported by conveyance 406. For example, image 400 may have been captured by one or more sensors (e.g., sensors 302-1, 302-2, 302-3, etc.) as item 402 is transported by conveyance 406. For example, item 402 may be being transported from a singulation system to a sortation system. Further, although FIG. 4A shows image 400 in the form of an image, according to other embodiments of the present disclosure, the item information captured by the plurality of sensors may include image information and/or data (e.g., pixel information, depth information, volume information, etc.) that has not been constructed into an actual image.

According to exemplary embodiments of the present disclosure, image 400 (or item information associated with image 400) may be processed by a trained machine learning model to identify item 402 and/or detect quality defects (e.g., multiples, damage to the item, etc.) associated with item 402. Additionally, after item 402 has been identified, image 400 (or item information associated with image 400) may be further processed and/or provided to datastores to generate and/or update information stored in connection with item 402 (e.g., in an item catalog, a virtual model of item 402, and the like).

As shown in FIG. 4A, image 400 shows a single item 402 (e.g., no presence of multiples), and no apparent signs of damage to item 402. Accordingly, the trained machine learning model utilized to process image 400 (and/or associated item information) may indicate that no quality defect condition exists in connection with item 402. Additionally, the trained machine learning model may also identify item 402 based on the provided image 400 (and/or associated item information). Subsequent to identification of item 402, image 400 (and/or associated item information) may be provided to one or more datastores configured to store and maintain information associated with item 402. For example, the item information may be processed and compared against item information stored and maintained in one or more datastores. The item information may then be used to generate and/or update any information stored in connection with the item.

Figure 4B:
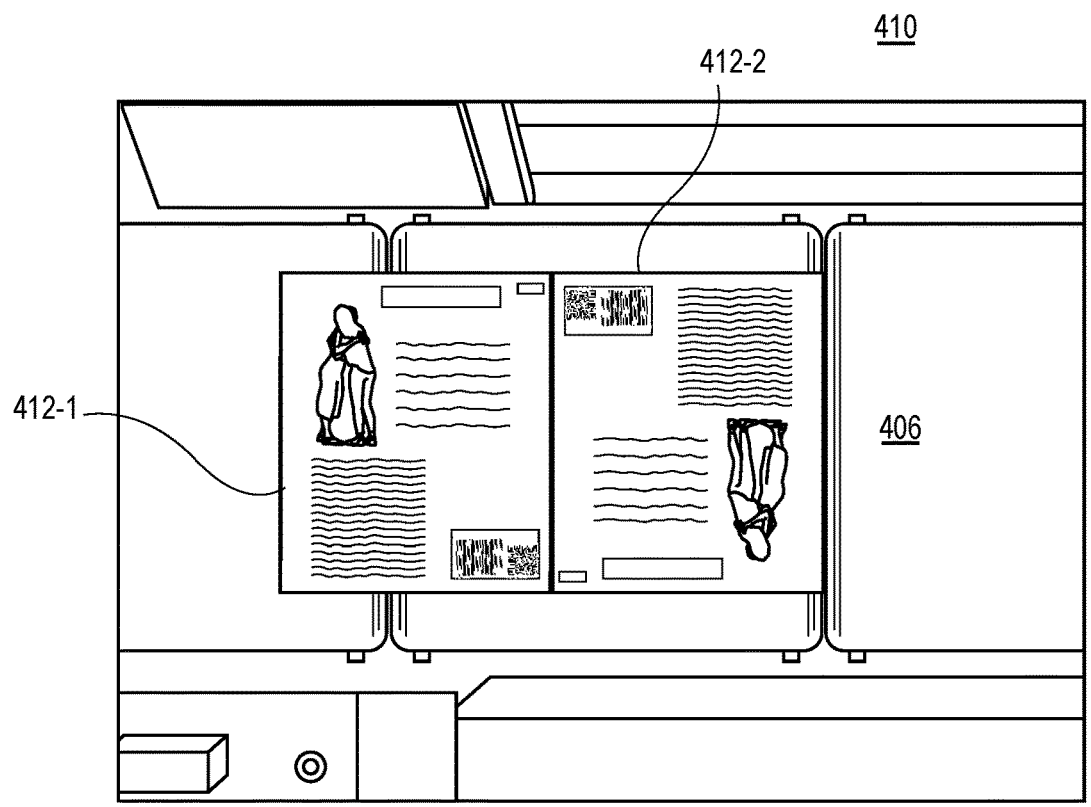
Figure 4C:
Figure 4D:
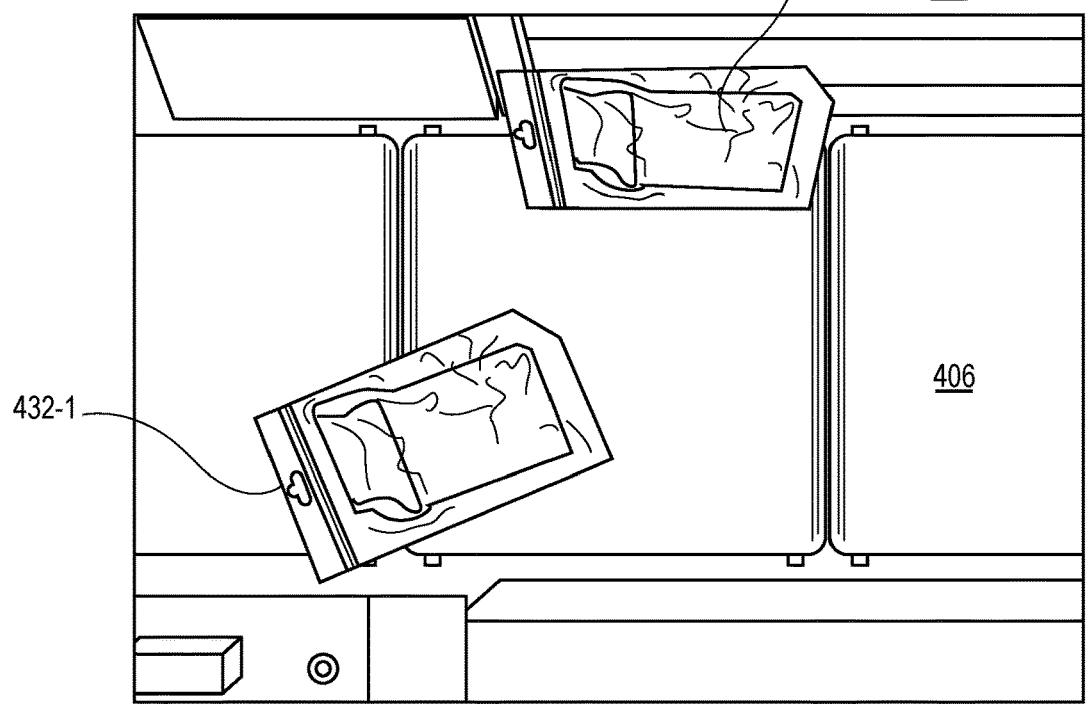

FIGS. 4B-4D show exemplary illustrations of images 410, 420, and 430 of multiples that may have been detected as items are processed by a defect detection system, according to exemplary embodiments of the present disclosure.

As shown in FIGS. 4B-4D, images 410, 420, and 430 may include visual representations of multiples of items 412, 422, 434, and 442, respectively, as they are being transported by conveyance 406. For example, images 410, 420, and 430 may have been captured by one or more sensors (e.g., sensors 302-1, 302-2, 302-3, etc.) as items 412-1, 412-2, 422-1, 422-2, 432-1, and 432-2 are transported by conveyance 406. For example, items 412-1, 412-2, 422-1, 422-2, 432-1, and 432-2 may be transported from a singulation system to a sortation system via conveyance 406. Further, although FIGS. 4B-4D shows images 410, 420, and 430 in the form of an image, according to other embodiments of the present disclosure, the item information captured by the plurality of sensors may include image information and/or data (e.g., pixel information, depth information, volume information, etc.) that has not been constructed and saved into an actual image.

According to exemplary embodiments of the present disclosure, images 410, 420, and 430 (or item information associated with images 410, 420, and 430) may be processed by a trained machine learning model to identify items 412-1, 412-2, 422-1, 422-2, 432-1, and 432-2 and/or detect quality defects (e.g., multiples, damage to the item, etc.) associated with items 412-1, 412-2, 422-1, 422-2, 432-1, and 432-2. Additionally, after items 412-1, 412-2, 422-1, 422-2, 432-1, and 432-2 have been identified, images 410, 420, and 430 (or item information associated with images 410, 420, and 430) may be further processed and provided to datastores to generate and/or update information stored in connection with items 412-1, 412-2, 422-1, 422-2, 432-1, and 432-2 (e.g., in an item catalog, a virtual model of items 412-1, 412-2, 422-1, 422-2, 432-1, and 432-2 and the like).

FIGS. 4B-4D illustrate exemplary implementations where the defect detection system may have detected a quality defect (e.g., multiples). As shown in FIG. 4B, image 410 shows an exemplary implementation where the defect detection system may have detected a multiple in connection with items 412-1 and 412-2, where items 412-1 and 412-2 may be positioned substantially adjacent to each other. For example, items 412-1 and 412-2 may have not been properly singulated, and one or more sensors employed by the defect detection system may have captured item information and/or image data corresponding to image 410 shown in FIG. 4B, which may have been provided to one or more trained machine learning models to process the input item information (e.g., imaging data, dimensions, detected features, volume, detected objects, etc.) to detect the multiple, as shown in FIG. 4B. Accordingly, the defect detection system may generate a defect condition associated with items 412-1 and 412-2 and generate an instruction to cause items 412-1 and 412-2 to be sorted for inspection and/or reprocessing.

FIGS. 4C and 4D illustrate further exemplary implementations where the defect detection system may have detected a quality defect (e.g., multiples). As shown in FIGS. 4C and 4D, images 420 and 430 show exemplary implementations where the defect detection system may have detected a multiple in connection with items 422-1, 422-2, 432-1, and 432-2. In the exemplary implementation shown in FIG. 4C, items 422-1 and 422-2 may be substantially overlapping each other and, in the exemplary implementation shown in FIG. 4D, items 432-1 and 432-2 may be substantially separated. Similar to the implementation shown in FIG. 4B, items 422-1, 422-2, 432-1, and 432-2 may have not been properly singulated. Accordingly, one or more sensors employed by the defect detection system may have captured item information and/or image data corresponding to images 420 and 430 shown in FIGS. 4C and 4D, respectively. The item information may have then been provided to one or more trained machine learning models, which processed the input item information (e.g., imaging data, dimensions, detected features, volume, detected objects, etc.) to detect the multiples, as shown in FIGS. 4C and 4D. Accordingly, the defect detection system may generate a defect condition associated with items 422-1, 422-2, 432-1, and 432-2 and generate an instruction to cause items 422-1, 422-2, 432-1, and 432-2 to be sorted for inspection and/or reprocessing.

Figure 5:
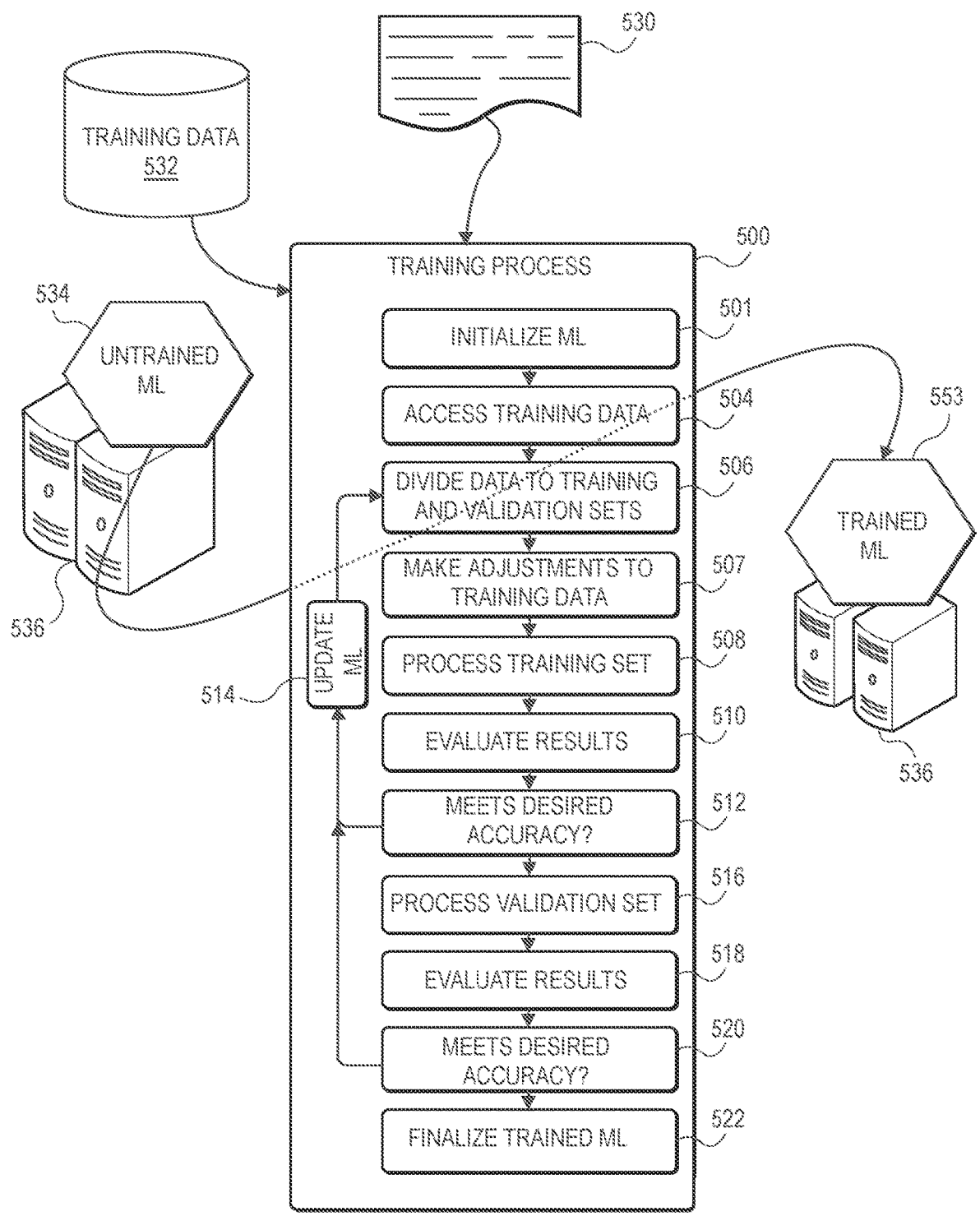
FIG. 5 is a flow diagram of an exemplary training process for training a machine learning model, according to exemplary embodiments of the present disclosure.

FIG. 5 is a flow diagram of an exemplary training process 500 for training a machine learning model (e.g., such as a deep learning model, a neural network, etc.), according to exemplary embodiments of the present disclosure.

As shown in FIG. 5, training process 500 is configured to train an untrained machine learning model (ML) 534 operating on a computer system 536 to transform untrained machine learning model into trained machine learning model 553 that operates on the same or another computer system, such as remote computing resource 536. In the course of training, as shown in FIG. 5, at step 501, untrained machine learning model 534 is initialized with training criteria 530. Training criteria 530 may include, but is not limited to, information as to a type of training, and number of layers to be trained, etc.

At step 504 of training process 500, a corpus of training data 532, may be accessed. For example, if training is to generate a trained machine learning model that detects quality defects, training data 532 may include images of items presented with quality defects (e.g., multiples, damaged items, etc.) and images of items presented without quality defects. Additionally, training data 532 may include images of items having different lighting conditions and different types of packaging (e.g., boxes, transparent packaging, books, irregular shapes, soft packages, etc.).

The exemplary embodiments discuss the use of labeled training data, meaning that the actual results of processing of the data items of the corpus of training data (i.e., whether the data corresponds to a positive or negative presence of a condition) are known. In certain embodiments, training data 532 may also or alternatively include unlabeled training data.

With training data 532 accessed, at step 506, training data 532 is divided into training and validation sets. Generally speaking, the items of data in the training set are used to train untrained machine learning model 534 and the items of data in the validation set are used to validate the training of the machine learning model. As those skilled in the art will appreciate, and as described below in regard to much of the remainder of training process 500, there are numerous iterations of training and validation that occur during the training of the machine learning model.

At step 507, some or all of the items of data of the training set may be adjusted. For example, lighting conditions may be adjusted, ratios of images presenting quality defects may be adjusted, images that provoked a false positive may be adjusted, and the like.

At step 508 of training process 500, the data items of the training set are processed, often in an iterative manner. Processing the data items of the training set include capturing the processed results. After processing the items of the training set, at step 510, the aggregated results of processing the training set are evaluated, and at step 512, a determination is made as to whether a desired accuracy level has been achieved. If the desired accuracy level is not achieved, in step 514, aspects of the machine learning model are updated in an effort to guide the machine learning model to generate more accurate results, and processing returns to step 506, where a new set of training data is selected, and the process repeats. Alternatively, if the desired accuracy level is achieved, the training process 500 advances to step 516.

At step 516, and much like step 508, the data items of the validation set are processed, and at step 518, the processing accuracy of this validation set is aggregated and evaluated. At step 520, a determination is made as to whether a desired accuracy level, in processing the validation set, has been achieved. If the desired accuracy level is not achieved, in step 514, aspects of the machine learning model are updated in an effort to guide the machine learning model to generate more accurate results, and processing returns to step 506. Alternatively, if the desired accuracy level is achieved, the training process 500 advances to step 522.

At step 522, a finalized, trained machine learning model 553 is generated. Typically, though not exclusively, as part of finalizing the now-trained machine learning model 553, portions of the machine learning model that are included in the model during training for training purposes are extracted, thereby generating a more efficient trained machine learning model 553.

Figure 6:
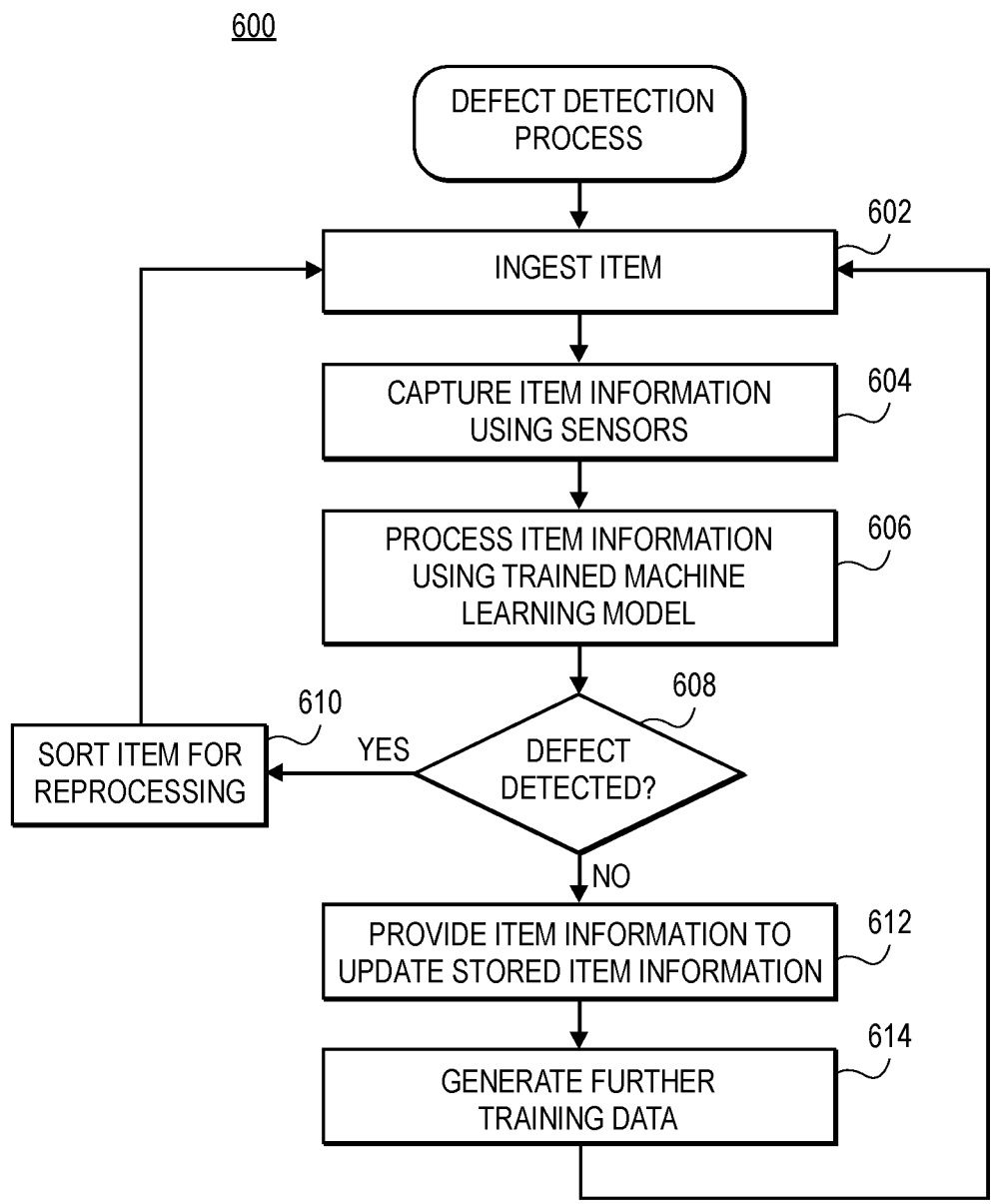
FIG. 6 is a flow diagram of an exemplary defect detection process, according to exemplary embodiments of the present disclosure.

FIG. 6 is a flow diagram of an exemplary defect detection process 600, according to exemplary embodiments of the present disclosure.

As shown in FIG. 6, process 600 may begin with the ingestion of an item, as in step 602. This can include ingestion of the item by an automated item handling system, or any component thereof, such as an automated singulation system. After the item has been ingested, in step 604, item information associated with the ingested item may be captured by one or more sensors. The item information may be captured by the sensors as the item is being transported via one or more conveyances by the automated item handling system (e.g., from an automated singulation system to a universal sortation system). According to exemplary embodiments of the present disclosure, the item information may include high-resolution images captured by one or more imaging devices. Alternatively and/or in addition, item information may include any information and/or attributes associated with the item, such as imaging data, depth information, weight, dimensions, volume information, three-dimensional point clouds, and the like, which may be captured by imaging sensors, cameras, infrared sensors, depth sensors, ranging or time of flight sensors, scales, scanners, or other types of sensors.

In step 606, the item information captured in step 604 may be processed by a trained machine learning model in real-time as the item is being processed by the automated item handling system. For example, the trained machine learning model (e.g., a neural network, a deep learning model, and the like) may process the item information (e.g., using algorithms to perform edge detection, feature detection, object detection, or other types of image processing algorithms) to detect quality defects in the item and/or identify the item in real-time. According to embodiments of the present disclosure, the trained machine learning model may process item information acquired from multiple different types of sensors (e.g., imaging sensors, cameras, infrared sensors, depth sensors, ranging or time of flight sensors, scales, scanners, or other types of sensors) and the trained machine learning model may generate a prediction regarding each of the various sensor information, along with a confidence score associated with each prediction. The item information and/or predictions associated with each data source may be aggregated (e.g., a weighted sum, etc.) to generate a prediction of whether a quality defect is detected and/or an identification of the item.

In step 608 it is determined whether a quality defect has been detected. In the event that a defect has been detected, the item may be sorted for further inspection and/or reprocessing, as in step 610. This may include, for example, an indication that a defect condition has been identified and generation of an instruction or command (e.g., instruction to the universal sortation system) to sort the item for further inspection and/or reprocessing.

If a defect has not been detected in connection with the item, the item may be processed by further downstream processes (e.g., by the universal sortation system). Optionally, in step 612, the item information may be provided to one or more datastores to generate and/or augment information stored in connection with the item. For example, item models may be stored and maintained for each item and/or an item catalog may be stored and maintained for all items. Based on the identification of the item determined by the trained machine learning model, it may be determined whether the identified item exists in the one or more datastores. In the event that the identified item does not exist in the datastores, an entry may be generated for the identified item. If an entry for the item exists in the datastores, the item information stored and maintained in the datastores can be updated with this information. This can improve the accuracy of the item information stored and maintained in the datastores.

Additionally, in step 614, the item information can be used to generate further training data for the trained machine learning model so as to improve the accuracy and performance of the trained machine learning model.

Figure 7:
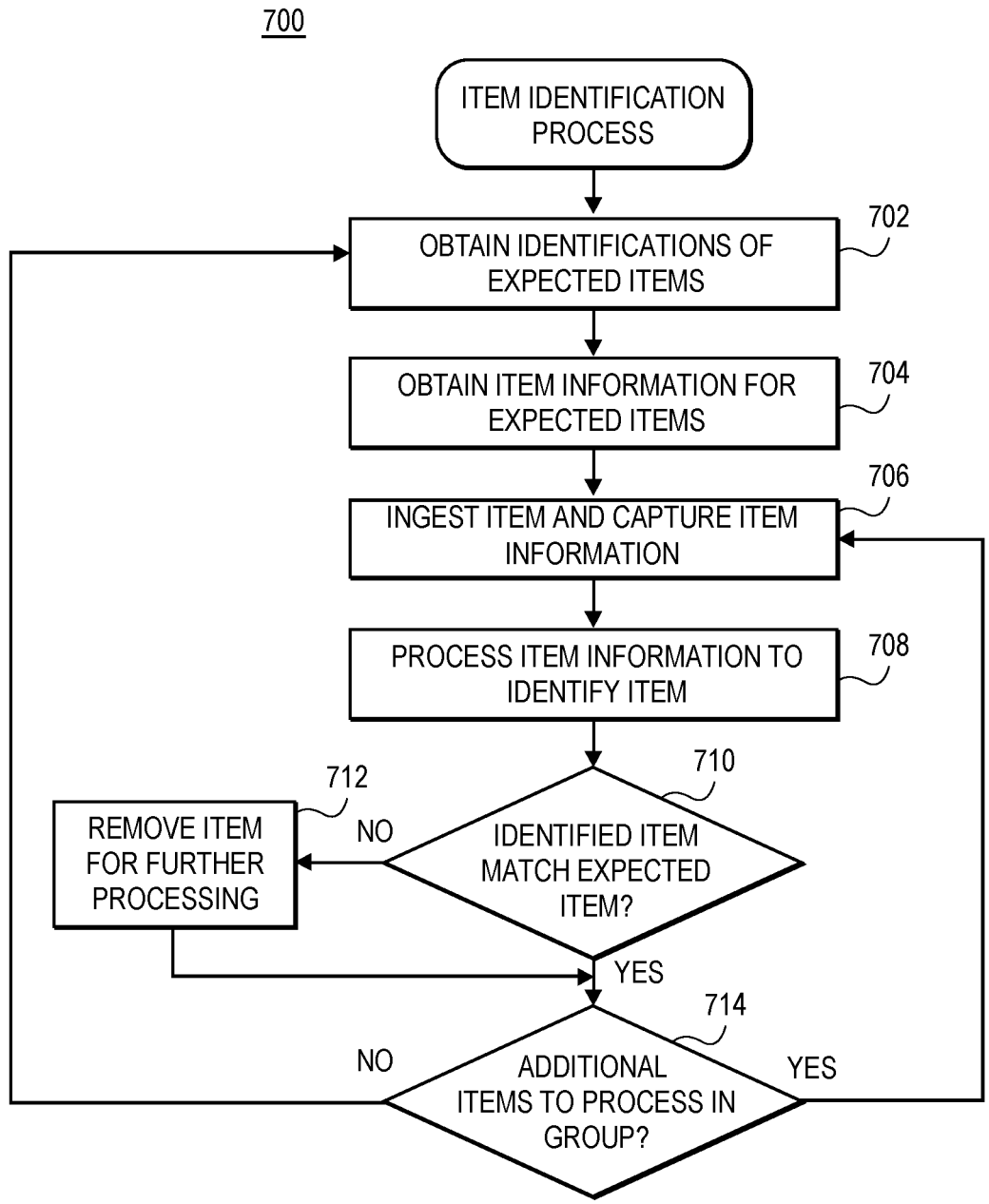
FIG. 7 is a flow diagram of an exemplary item identification process, according to exemplary embodiments of the present disclosure.

FIG. 7 is a flow diagram of an exemplary item identification process 700, according to exemplary embodiments of the present disclosure.

As shown in FIG. 7, process 700 may begin with obtaining the identification of a grouping of expected items, as in step 702. This may include, for example, a list of items that are to be processed by the automated item handling system, such as an automated singulation system. This may be provided in connection with items prior to ingestion into the automated item handling system. This may include, for example, items that are contained in a container of items that is to be ingested into the automated item handling system, a pallet of items that has been depalletized in preparation for ingestion into the automated item handling system, and the like. After the expected items have been identified, item information associated with the expected items may be obtained, as in step 704. This may include any models, catalog entries, or other item information that may be stored and/or maintained in connection with the expected items. According to certain aspects of the present disclosure, this item information may be obtained and temporarily stored locally for improved performance.

In step 706, the items may be ingested by the automated item handling system and item information associated with the ingested items may be captured by one or more sensors. The item information may be captured by the sensors as the item is being transported via one or more conveyances by the automated item handling system (e.g., from an automated singulation system to a universal sortation system). According to exemplary embodiments of the present disclosure, the item information may include high-resolution images captured by one or more imaging devices. Alternatively and/or in addition, item information may include any information and/or attributes associated with the item, such as imaging data, depth information, weight, dimensions, volume information, three-dimensional point clouds, and the like, which may be captured by imaging sensors, cameras, infrared sensors, depth sensors, ranging or time of flight sensors, scales, scanners, or other types of sensors.

In step 708, the item information captured in step 706 may be processed by a trained machine learning model in real-time as the item is being processed by the automated item handling system. For example, the trained machine learning model (e.g., a neural network, a deep learning model, and the like) may process the item information (e.g., using algorithms to perform edge detection, feature detection, object detection, or other types of image processing algorithms) to identify the item in real-time. This may be in addition to detecting quality defects associated with the item. According to embodiments of the present disclosure, the trained machine learning model may process item information acquired from multiple different types of sensors (e.g., imaging sensors, cameras, infrared sensors, depth sensors, ranging or time of flight sensors, scales, scanners, or other types of sensors) and the trained machine learning model may generate a prediction regarding each of the various sensor information, along with a confidence score associated with each prediction. The item information and/or predictions associated with each data source may be aggregated (e.g., a weighted sum, etc.) to generate a prediction of an identification of the item.

In step 710 it is determined whether the identified item matches with an expected item. For example, if it was expected that the ingested items would include a tennis racket, tennis balls, and tennis shoes, it is determined whether the identified item was one of a tennis racket, tennis balls, or tennis shoes. If the ingested item did not match information relating to the expected items, the item may be removed for further processing, as in step 712. This may include, for example, an indication that an unexpected item has been identified and generation of an instruction or command (e.g., to instruction the universal sortation system) to sort the item for further inspection and/or reprocessing.

If the item matches an expected item, in step 714, it may be determined if there are additional items in the grouping that need to be processed. If there are additional items in the group for processing, the process returns to ingesting the next item and repeating the identification and matching process. In the event there are no more items in the grouping for processing, the process may return to step 702 and identification of the expected items in the next group of items may be obtained.

Figure 8:
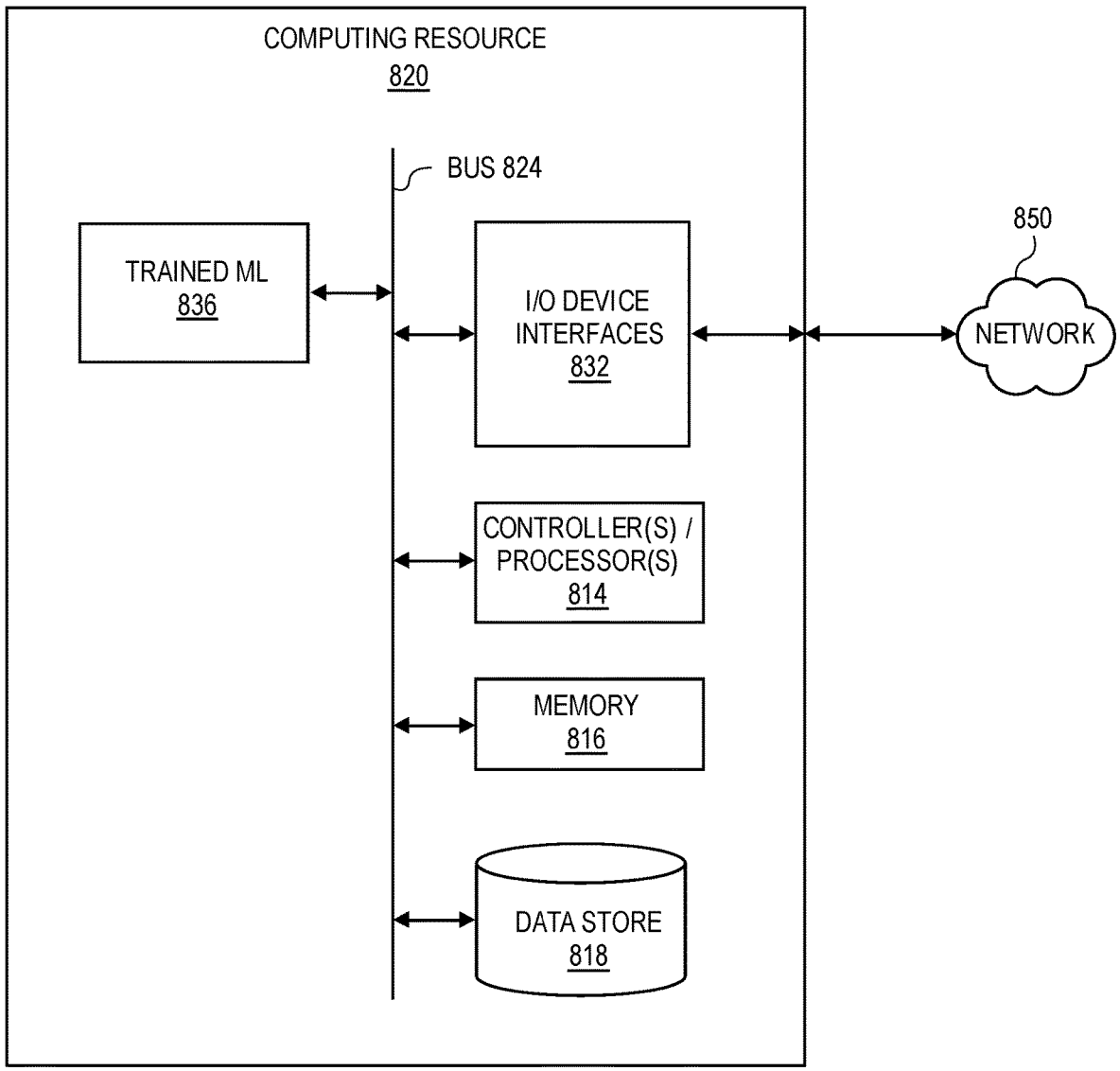
FIG. 8 is a block diagram of an exemplary computing resource, according to exemplary embodiments of the present disclosure.

FIG. 8 is a block diagram conceptually illustrating example components of an exemplary remote computing device 820, that may include and/or execute one or more of the above discussed trained machine learning models, according to exemplary embodiments of the present disclosure. Multiple such servers 820 may be included in the system.

Each of these computing resources 820 may include one or more controllers/processors 814, that may each include a central processing unit (CPU) for processing data and computer-readable instructions, and memory 816 for storing data and instructions. Memory 816 may individually include volatile random access memory (RAM), non-volatile read only memory (ROM), non-volatile magnetoresistive (MRAM) and/or other types of memory. Each server may also include data storage component 818, for storing data, controller/processor-executable instructions, training data, labels, etc. Each data storage component may individually include one or more non-volatile storage types such as magnetic storage, optical storage, solid-state storage, etc. Each computing resource may also be connected to removable or external non-volatile memory and/or storage (such as a removable memory card, memory key drive, networked storage, etc.), internal, and/or external networks 850 (e.g., the Internet) through respective input/output device interfaces 832.

Computer instructions for operating each computing resource 820 and its various components may be executed by the respective controller(s)/processor(s) 814, using the memory 816 as temporary "working" storage at runtime. Computer instructions may be stored in a non-transitory manner in non-volatile memory 816, storage 818, and/or an external device(s). Alternatively, some or all of the executable instructions may be embedded in hardware or firmware on the respective device in addition to or instead of software.

Each computing resource 820 includes input/output device interfaces 832. A variety of components may be connected through the input/output device interfaces. Additionally, each server 820 may include an address/data bus 824 for conveying data among components of the respective server. Each component within computing resource 820 may also be directly connected to other components in addition to (or instead of) being connected to other components across the bus 824.

Each server may also include one or more trained machine learning models 836, as discussed herein. The components of computing resource 820, as illustrated in FIG. 8, are exemplary, and may be located as a stand-alone device or may be included, in whole or in part, as a component of a larger device or system.

Figure 9:
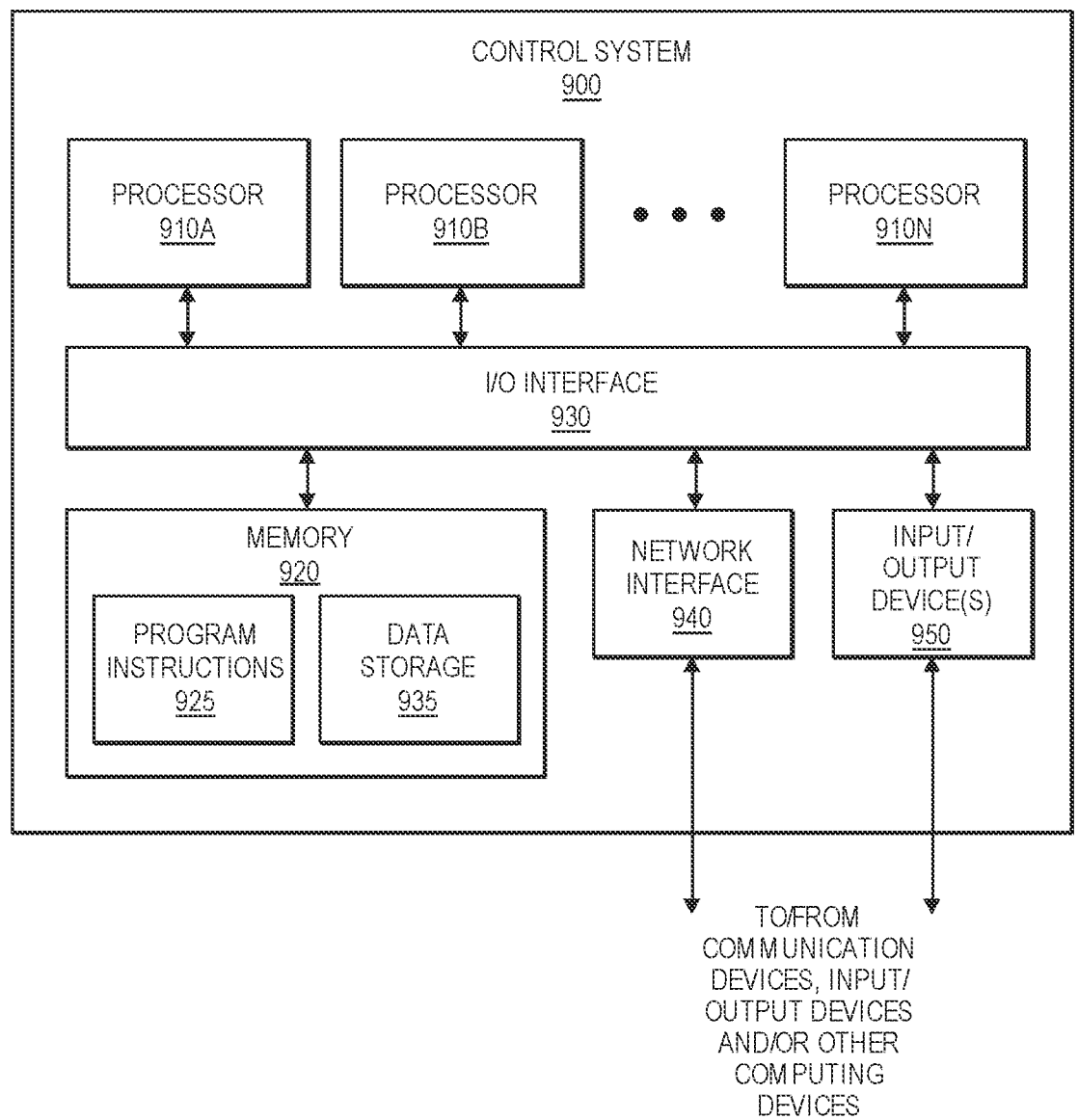
FIG. 9 is a block diagram illustrating an exemplary control system, according to exemplary embodiments of the present disclosure.

FIG. 9 is a block diagram illustrating an example control system 900, in accordance with embodiments of the present disclosure. Control system 900 can be an exemplary implementation of control systems 120 and 220 described above in connection with FIGS. 1 and 2, respectively.

Although control systems 120, 220, and 900 have been generally described herein as separate and in communication with the various components of the exemplary systems and methods described herein, in other example embodiments, control systems 120, 220, and 900, or portions thereof, may be combined or integrated with one or more other portions, components, or elements of the systems. For example, control systems 120, 220, and 900 may be integrated with one or more of item singulation stations, universal item sorters, and/or defect detection systems. Various other combinations or integrations of at least a portion of the control system with one or more other portions, components, or elements of the systems and methods described herein may also be used to facilitate movement, separation, presentation, identification, picking, induction, sortation, singulation, and/or packing of one or more items.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 9. In the illustrated implementation, control system 900 includes one or more processors 910A, 910B through 910N, coupled to non-transitory computer-readable storage medium 920 via input/output (I/O) interface 930. Control system 900 further includes network interface 940 coupled to I/O interface 930, and one or more input/output devices 950. In some implementations, it is contemplated that a described implementation may be implemented using a single instance of control system 900 while, in other implementations, multiple such systems or multiple nodes making up control system 900 may be configured to host different portions or instances of the described implementations. For example, in one implementation, some data sources or services (e.g., related to item movement, separation, presentation, imaging, identification, picking, placing, sorting, singulating, packing, etc.) may be implemented via one or more nodes of control system 900 that are distinct from those nodes implementing other data sources or services.

In various implementations, control system 900 may be a uniprocessor system including one processor 910A, or a multiprocessor system including several processors 910A—910N (e.g., two, four, eight, or another suitable number). Processors 910A-910N may be any suitable processor capable of executing instructions. For example, in various implementations, processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of processors 910A-910N may commonly, but not necessarily, implement the same ISA.

Non-transitory computer-readable storage medium 920 may be configured to store executable instructions and/or data accessible by one or more processors 910A-910N. In various implementations, non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to control system 900 via I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via network interface 940.

In one implementation, I/O interface 930 may be configured to coordinate I/O traffic between processors 910A-910N, non-transitory computer-readable storage medium 920, and any peripheral devices, including network interface 940 or other peripheral interfaces, such as input/output devices 950. In some embodiments, I/O interface 930 may perform any necessary protocol, timing or other data transformations to convert data signals from one component (e.g., non-transitory computer-readable storage medium 920) into a format suitable for use by another component (e.g., processors 910A-910N). In some embodiments, I/O interface 930 may include support for devices attached through various types of peripheral buses, such as a variant of the Peripheral Component Interconnect (PCI) bus standard or the Universal Serial Bus (USB) standard, for example. In some implementations, the function of I/O interface 930 may be split into two or more separate components, such as a north bridge and a south bridge, for example. Also, in some embodiments, some or all of the functionality of I/O interface 930, such as an interface to the non-transitory computer-readable storage medium 920, may be incorporated directly into processors 910A-910N.

Network interface 940 may be configured to allow data to be exchanged between control system 900 and other devices attached to a network, such as other control systems, computer systems, item singulation stations, universal item sorters, item handling station, item packing stations, vision systems, item picking systems, robotic systems, robotic or mobile drive units and systems, other material handling systems or equipment, or between nodes of the control system 900. In various embodiments, network interface 940 may support communication via wired or wireless general data networks, such as any suitable type of Ethernet network.

Input/output devices 950 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in control system 900 or may be distributed on various nodes of control system 900. In some implementations, similar input/output devices may be separate from control system 900 and may interact with one or more nodes of control system 900 through a wired or wireless connection, such as over network interface 940.

As shown in FIG. 9, memory 920 may include program instructions 925 that may be configured to implement one or more of the described implementations and/or provide data storage 935, which may comprise various tables, data stores and/or other data structures accessible by program instructions 925. Program instructions 925 may include various executable instructions, programs, or applications to facilitate item movement, separation, presentation, imaging, identification, picking, placing, sorting, singulating, packing, retrieving, defect detection, or other processes, such as motor controllers, drivers, or applications, sensor controllers, drivers, or applications, sensor data processing applications, imaging data processing applications, robotic apparatus controllers, drivers, or applications, etc. Data storage 935 may include various data stores for maintaining data related to item singulation stations, universal item sorters, item handling stations, item packing stations, motors, sensors, movement speeds, directions, durations, and/or patterns, sensor data, items, pickable surfaces of items, imaging data, robotic arms, end effectors, upstream systems or processes, downstream systems or processes, etc.

Those skilled in the art will appreciate that the control system 900 is merely illustrative and is not intended to limit the scope of implementations. In particular, the control system and devices may include any combination of hardware or software that can perform the indicated functions, including computers, network devices, internet appliances, robotic devices, etc. The control system 900 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, and machine learning should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 5-7, orders in which such methods or processes are presented are not intended to be construed as any limitation on the claimed inventions, and any number of the method or process steps or boxes described herein can be omitted, reordered, or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. An automated item handling system, comprising:
   an automated item singulation system;
   an automated item sortation system;
   a conveyance configured to transport items from the automated item singulation system to the automated item sortation system;
   a quality defect detection system including:
      a first imaging device positioned and oriented at a first position relative to the conveyance to capture a first image of an item being transported on the conveyance from an overhead view of the item;
      a second imaging device positioned and oriented at a first position relative to the conveyance to capture a second image of the item being transported on the conveyance from a front side of the item;
      a third imaging device positioned and oriented at a second position relative to the conveyance to capture a third image of the item being transported on the conveyance from a rear of the item;
      a trained machine learning model executing on a computing resource configured to, at least:
         obtain at least one of the first image, the second image, and the third image as inputs; and
         process at least one of the first image, the second image, and the third image to determine a quality defect and a quality defect type associated with the item; and
   a control system in communication with the quality defect detection system and the automated item sortation system, the control system being configured to, at least:
      cause, based at least in part on the determination of the quality defect and the quality defect type associated with the item, the automated item sortation system to sort the item into a container designated for items with quality defects of the quality defect type.

2. The automated item handling system of claim 1, wherein the quality defect type includes at least one of:
   a multiple;
   a damaged item;
   an unexpected item; or
   an incomplete item.

3. The automated item handling system of claim 1, wherein the trained machine learning model is further configured to, at least:
   process at least one of the first image, the second image, and the third image to determine an identification of the item; and
   the control system is further configured to, at least:
      determine, based at least in part on the identification of the item, that item information associated with the item is stored in a datastore; and
      update the item information with at least one of the first image, the second image, and the third image.

4. The automated item handling system of claim 3, wherein the item information associated with the item includes at least one of a virtual item model or a catalog entry.

5. An automated item processing method, comprising:
ingesting a plurality of items into an automated item singulation system;
singulating, using the automated item singulation system, the plurality of items;
subsequent to singulation of the plurality of items, transporting a first item from the plurality of items, via a conveyance, from the automated item singulation system to an automated item sortation system;
obtaining, via a plurality of sensors, a plurality of item information associated with the first item while the first item is being transported via the conveyance;
processing, using a trained machine learning model, the plurality of item information to determine a quality defect and a quality defect type associated with the first item; and
sorting, using the automated item sortation system and based at least in part on the determination of the quality defect and the quality defect type associated with the first item, the first item into a container designated for items with quality defects of the quality defect type.

6. The automated item processing method of claim 5, wherein the plurality of sensors includes at least one of:
an imaging device;
a scale;
a time-of-flight sensor;
an infrared sensor;
a depth sensor; or
a scanner.

7. The automated item processing method of claim 5, wherein the quality defect type includes at least one of:
a multiple;
a damaged item;
an unexpected item; or
an incomplete item.

8. The automated item processing method of claim 7, wherein the multiple indicates that the first item includes more than one item.

9. The automated item processing method of claim 8, wherein the more than one items are overlapping such that one of the more than one items is substantially occluded.

10. The automated item processing method of claim 5, wherein the plurality of item information includes at least one of:
an image of the first item;
a dimension of the first item;
a volume of the first item;
a point cloud of the first item; or
a weight of the first item.

11. The automated item processing method of claim 5, further comprising:
aggregating, using the trained machine learning model the plurality of item information, prior to determination of the quality defect and the quality defect type.

12. The automated item processing method of claim 5, further comprising:
subsequent to singulation of the plurality of items, transporting a second item from the plurality of items, via the conveyance, from the automated item singulation system to the automated item sortation system;
obtaining, via a plurality of sensors, a second plurality of item information associated with the second item while the second item is being transported by the conveyance;
processing, using the trained machine learning model, the second plurality of item information to determine an identification of the second item;
comparing the identification of the second item against a plurality of expected items to determine that the second item is not included in the plurality of expected items; and
sorting, using the automated item sortation system and based at least in part on the determination that the second item is not included in the plurality of expected items, the second item into a second container designated for unexpected items.

13. The automated item processing method of claim 5, further comprising:
processing, using the trained machine learning model, the plurality of item information to determine an identification of the first item;
determining, based at least in part on the identification of the first item, that at least one of a virtual model or catalog information associated with the first item is stored in a datastore; and
updating at least one of the virtual model or the catalog information associated with the first item with the plurality of item information.

14. A defect detection system, comprising:
a plurality of sensors configured to capture a plurality of item information associated with an item being transported via a conveyance from an automated item singulation system to an automated item sortation system;
a trained machine learning model executing on a computing resource configured to, at least:
obtain the plurality of item information; and
process the plurality of item information to determine a quality defect and a quality defect type associated with the item; and
a control system in communication with the quality defect detection system and the automated item sortation system, the control system being configured to, at least, instruct, based at least in part on the determination of the quality defect and the quality defect type associated with the item, the automated item sortation system to sort the item into a container designated for items with quality defects of the quality defect type.

15. The defect detection system of claim 14, wherein the plurality of sensors includes at least one of:
an imaging device;
a scale;
a time-of-flight sensor;
an infrared sensor;
a depth sensor; or
a scanner.

16. The defect detection system of claim 14, wherein the plurality of item information includes at least one of:
an image of the first item;
a dimension of the first item;
a volume of the first item;
a point cloud of the first item; or
a weight of the first item.

17. The defect detection system of claim 14, wherein the quality defect type includes at least one of:
a multiple;
a damaged item;
an unexpected item; or
an incomplete item.

18. The defect detection system of claim 14, wherein the trained machine learning model is further configured to, at least, aggregate the plurality of item information to determine the quality defect.

19. The defect detection system of claim 14, wherein the trained machine learning model is further configured to, at least:
   process the plurality of item information to determine an identification of the item; and
   the control system is further configured to, at least:
      determine, based at least in part on the identification of the item, that at least one of a virtual model or catalog information associated with the item is stored in a datastore; and
      update at least one of the virtual model or the catalog information with the plurality of item information.

20. The defect detection system of claim 14, wherein the control system is further configured to, at least:
   generate further training data for the trained machine learning model based on the plurality of item information.

\* \* \* \* \*